United States Patent [19]

Cahuzac et al.

[11] Patent Number: 4,863,660
[45] Date of Patent: Sep. 5, 1989

[54] PROCESS FOR MANUFACTURING COMPOSITE REINFORCEMENT ELEMENTS WOVEN IN THREE DIMENSIONS

[75] Inventors: Georges J. J. Cahuzac, Saint Jean D'Illac; Francois Monget, Merignac, both of France

[73] Assignee: Aerospatiale Societe Nationale Ind., France

[21] Appl. No.: 172,704

[22] Filed: Mar. 23, 1988

[30] Foreign Application Priority Data

Mar. 25, 1987 [FR] France ................................ 87 04126

[51] Int. Cl.$^4$ ..................... B65H 54/64; B65H 81/00; B29C 41/22
[52] U.S. Cl. ................................... 264/103; 264/257; 264/258; 264/278; 264/317; 156/173
[58] Field of Search .............. 264/275, 277, 278, 257, 264/258, 136, 137, 317, DIG. 44, 103; 156/169, 173; 66/11; 139/22, 408, 387 R, 16

[56] References Cited

U.S. PATENT DOCUMENTS

| | | | |
|---|---|---|---|
| 3,082,134 | 3/1963 | Wentz | 156/173 |
| 3,189,500 | 6/1965 | Escher | 156/173 |
| 3,615,983 | 10/1971 | Palfreyman | 156/173 |
| 3,654,009 | 4/1972 | Judd | 156/173 |
| 3,743,561 | 7/1973 | Koontz | 264/137 |
| 3,749,138 | 7/1973 | Rheaume | 139/408 |
| 3,765,979 | 10/1973 | Thomas | 156/173 |
| 3,765,980 | 10/1973 | Hurlbert | 156/173 |
| 3,834,424 | 9/1974 | Fukuta | 139/22 |
| 3,843,759 | 10/1974 | Keeham | 264/137 |
| 4,001,478 | 1/1977 | King | 139/387 R |
| 4,147,822 | 4/1979 | Kallmeyer | 139/16 |
| 4,183,232 | 1/1980 | Banos | 66/11 |
| 4,346,741 | 8/1982 | Banos | 139/387 R |
| 4,414,049 | 11/1983 | Jones | 264/258 |
| 4,529,139 | 7/1985 | Smith | 156/173 |

Primary Examiner—James Lowe
Assistant Examiner—Jeremiah F. Dunkin, II
Attorney, Agent, or Firm—McGlew & Tuttle

[57] ABSTRACT

A plurality of parallel layers of fibers are laid in two crossed directions on a disposable support mandrel, pins are temprorarily implanted in the mandrel (15) composed of foam material in regions of evolution of its shape and at points where it is desired to change the direction of the fiber, a continuous thread (33) is stretched out between the pins so as to form crossed superimposed layers, and a continuous fiber (50) is introduced by means of a needle (43) through the layers and forms successive open loops (53). The loops (53) are maintained by the elastic pressure exerted by the foam material and the gripping action of said layers. The fibers are impregnated with a binder and the binder is hardened and the mandrel is destroyed.

9 Claims, 3 Drawing Sheets

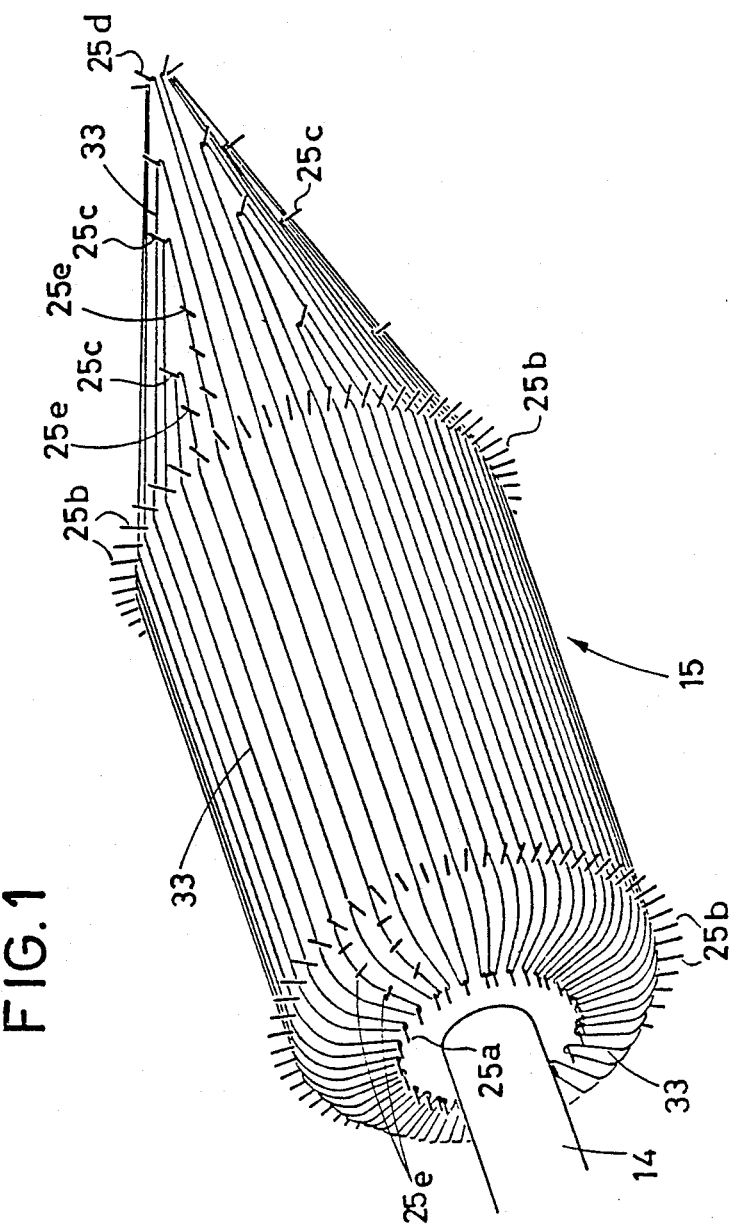

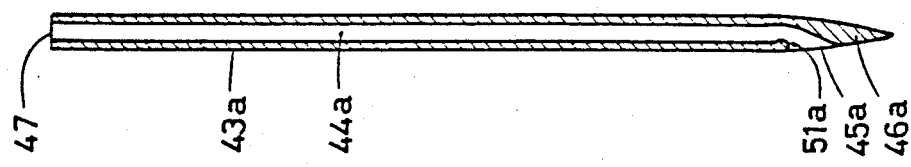
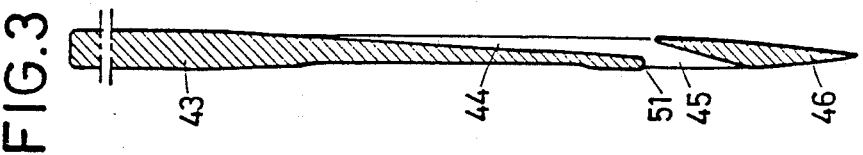
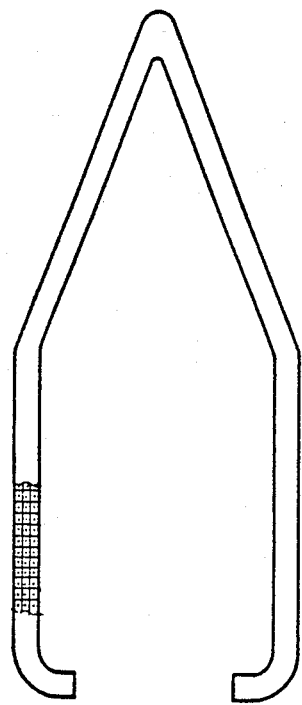
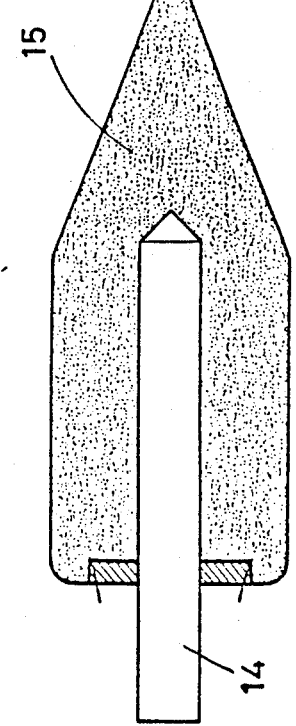

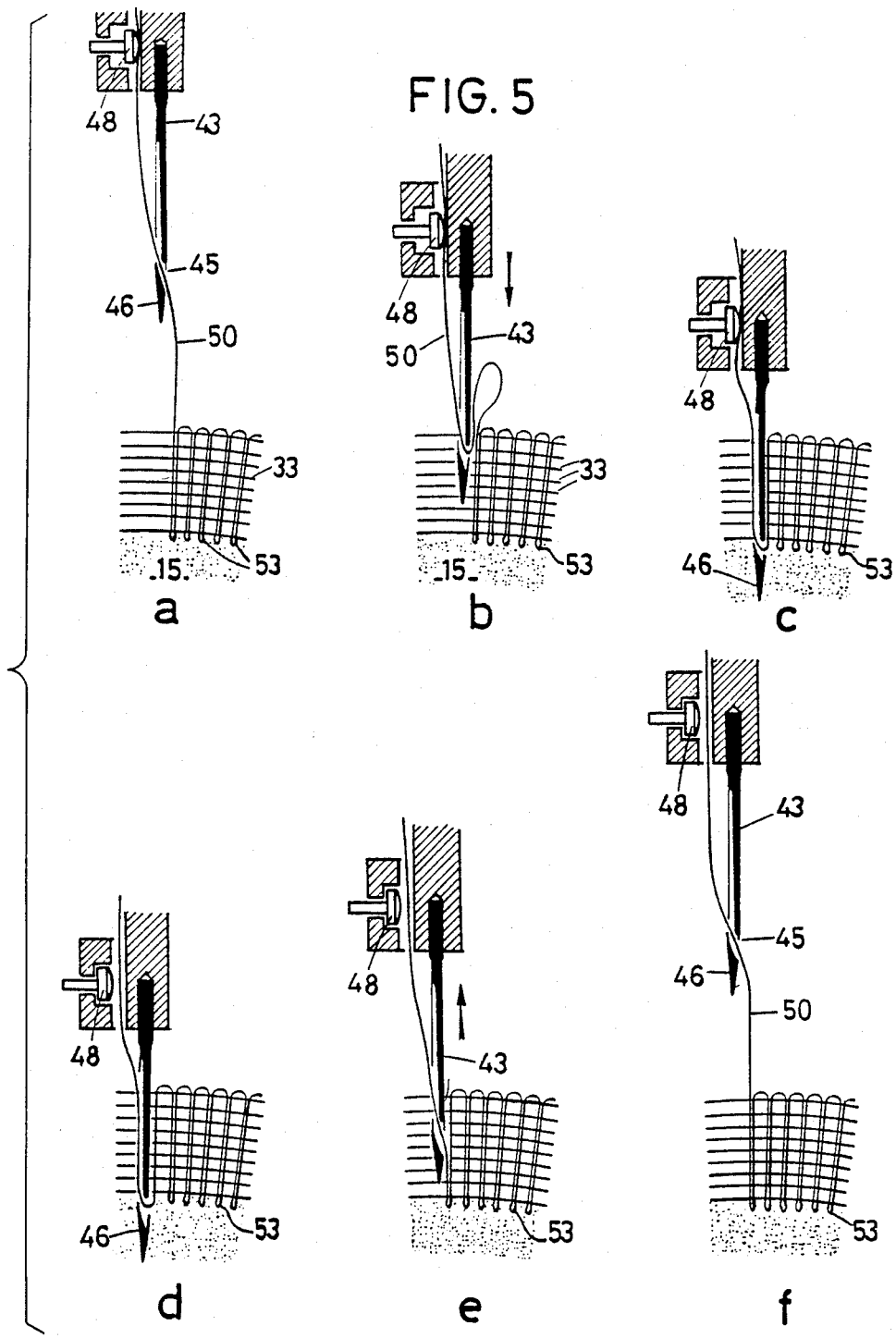

PROCESS FOR MANUFACTURING COMPOSITE REINFORCEMENT ELEMENTS WOVEN IN THREE DIMENSIONS

FIELD OF THE INVENTION

The present invention relates to the manufacture of composite reinforcement elements woven or knitted in three dimensions from textile, mineral, synthetic or other fibers impregnated with a resin which is then polymerized or otherwise hardened.

BACKGROUND OF THE INVENTION

Reinforcement elements of this type are principally, but not exclusively, employed in the aeronautic and space fields in which they have many applications, in particular for producing parts which must resist thermo-mechanical stresses, such as thermal protections of bodies re-entering the atmosphere, explosive-driven rocket nozzles, aircraft brakes, or parts which must withstand high mechanical stresses, such as the hubs of helicopter rotors, landing undercarriages, roots of wings, leading edges, etc.

Many processes and apparatus have been imagined and developed for producing such reinforcement elements, but the automatized manufacture of parts of complex shape encounters great difficulties which result in very complicated and consequently costly machines without the parts obtained always possessing the required qualities of homogeneity and resistance.

Moreover, the remarkable properties of these composite elements lead to the use thereof for producing parts having complicated, evolutive shapes that present machines are incapable of manufacturing.

It is known to produce hollow, composite reinforcement elements of revolution woven in two dimensions horizontally around rigid, perpendicular rods mounted in concentric ring arrangements on a rotatable support, which are subsequently replaced by threads, as described for example in U.S. Pat. Nos. 4,183,232 and 4,346,741 filed in the name of the applicant.

According to another method, a hollow support mandrel is used, parallel layers of threads are laid in two crossed directions on the surface of the mandrel and stitching lines are formed in a direction perpendicular to these layers, as described in particular in No.FR-A-2,355,936.

According to No. FR-A-2,315,562, the hollow support mandrel is of metal, capable of being taken apart, and formed by spaced-apart sectors having apertures in which are driven points about which are stretched out threads forming the different superimposed crossing layers which are thereafter sewn by rows of stitches formed in the gaps between the sectors of the mandrel.

All these processes disclosed in these documents require a hollow mandrel since the connection of the superimposed layers by stitching necessarily results in the introduction in the mandrel of a device for knotting the thread introduced from the exterior.

Moreover, the stitches are effected with needles with flaps or closed eyes which are delicate to use for fragile fibers requiring sometimes a double lapping of the thread.

Another process disclosed in No.FR-A-2,408,676 on the other hand employs a solid mandrel of foam material on which are mounted sections of rigid threads, termed "picots" around which the layers of threads are laid in two different directions and which constitute the threads of the third direction.

This process has various drawbacks. First of all, the "picots" must be previously subjected to a pre-rigidifying treatment, which increases their diameter, to permit the implantation thereof.

Secondly, the "picots" which must become an integral part of the part to be produced must consequently be provided in a considerable number, on the order of several tens of thousands, implanted very close together, which represents an extremely long operation requiring high precision.

Furthermore, in the case of a part having a complex shape whose surface forms corners or curves, the implantation of the neighboring "picots" which are excessively close together, is very difficult to achieve without interference therebetween, and the very narrow passageways defined therebetween do not permit an easy laying of threads in even layers, which laying is even found to be impossible in the regions where the threads change orientation.

Lastly, the "picots" excessively close together behave imperfectly, in particular in the curved parts, which results in defects in the homegeneity in the finished part.

SUMMARY AND OBJECTS OF THE INVENTION

An object of the invention is to overcome these drawbacks, and those of the other processes of the prior art, by providing a new process whereby it is possible to produce reinforcement elements which are not only in the form of a solid of revolution, but also have an evolutive profile (large variations in diameter and curvature) and shapes having flat surfaces or even flat shapes or blocks.

The invention therefore provides a process for manufacturing composite reinforcement elements woven in three dimensions from textile, mineral, synthetic or other fibers, of complex shape, having high resistance to thermal, mechanical or thermo-mechanical stresses, intended more particularly for applications in the aeronautic or space field. The invention includes the steps of employing a disposable mandrel; composed of foam or like material having externally the interior shape of the reinforcement element to be produced, implanting rigid members in the mandrel, and applying on the surface of the mandrel successive layers of threads or fibers, which layers are superimposed and crossed in at least two directions, connecting said layers to each other by means of threads or fibers which extend perpendicularly therethrough, impregnating the assembly with a hardenable binder, and removing the mandrel preferably by destroying the mandrel, wherein said rigid members are pins temporarily implanted in the mandrel so as to retain a continuous thread of fibers stretched out on said pins and in contact with the surface of the mandrel, the process further comprising stretching out a continuous thread on said pins so as to form in succession at least three even, superimposed and crossed layers, and introducing through said layers, from the exterior, a continuous thread forming successive open loops by means of a needle through which said thread passes, and withdrawing said pins.

According to another feature of the invention, said layers are maintained assembled by a conjugate gripping and friction action of the threads of said layers on said thread loops.

BRIEF DESCRIPTION OF THE DRAWINGS

The following description with reference to the accompanying drawings given by way of non-limitative examples will explain how the invention may be carried out.

FIG. 1 is a perspective view of an embodiment of a reinforcement element in process of being manufactured and showing the arrangement of the pins implanted in a mandrel and the arrangement of the thread stretched out on these pins.

FIG. 2 is a longitudinal sectional view to a reduced scale of the mandrel of FIG. 1, composed of a foam material and fixed on a mandrel support shaft.

FIG. 3 is a view to an enlarged scale of a needle employed for carrying out the process according to the invention.

FIG. 4 is a view similar to FIG. 3 of another embodiment of a needle.

FIGS. 5a to 5f are diagrammatic sectional views of the various stages of the introduction of the continuous thread loops through the layers laid on the surface of the mandrel according to the invention.

FIG. 6 is a longitudinal sectional view of the finished reinforcement element.

DESCRIPTION OF THE PREFERRED EMBODIMENTS

The process of the invention comprises implanting or inserting pins 25a ... 25e in a mandrel 15 composed of foam material at points on the surface of the latter chosen as a function of its shape for retaining and maintaining a thread 33 stretched out against this surface between these pins so as to form an even layer.

In the embodiment illustrated in FIG. 1, the mandrel has a cylindro-conical shape corresponding to the internal shape of a reinforcement to be produced.

For example, a first series of pins 25a is implanted around the mandrel support shaft 14 on the roughly flat section of the mandrel. Thereafter, there are implanted, for example, two circumferential rows of pins 25b at the ends of the cylindrical body of the mandrel, pins 25c in staggered relation on the conical end part, pins 25d at the apex of this end part and lastly pins 25e in circumferential rows on the parts of the surface of the mandrel which are inclined with respect to its shaft 14.

Note that the pins 25b and all those implanted in the surfaces of the mandrel which are parallel, or nearly parallel, to its shaft are perpendicular to its surface, while the pins 25a, 25c, 25d and 25e and generally all those implanted in surfaces which are inclined and perpendicular to this shaft will be advantageously inclined in the desired direction so that the thread tends to slide thereon and comes to be lodged in an acute angle made by each of these pins with the associated surface of the mandrel.

When the pins have been implanted in all the chosen points, one end of a thread is for example fixed on one of the pins 25a and the thread is pulled between the pins 25b to beyond one of the pins 25d at the apex of the cone.

The mandrel is then rotated through one step and the thread 33 is brought back and passed around said pin 25d, between two pins 25b, then passed around in the same way a second pin 25a adjacent to that of the start of the operation.

In order to avoid an accumulation of thread in the vicinity of the apex of the cone, the thread is made to pass around intermediate pins 25c arranged in staggered relation on the cone.

When a first even layer of thread 33 has been laid in this way in the longitudinal direction, a second layer of thread is laid, for example at 90°, circumferentially.

This winding may be effected in a helical manner from, for example, one of the pins 25a by turning the mandrel.

The circumferential rows of pins 25e inclined in an appropriate manner are adapted to receive a thread and to retain it in contact with the surface of the roughly planar end of the mandrel, and on its rounded part up to the beginning of the cylindrical part.

Similarly, the circumferential rows of pins 25e on the conical part are adapted to prevent the thread from slipping toward the apex.

The pins 25b implanted in the parts of the surface which are parallel to the shaft of the mandrel are adapted to maintain an even spacing of the threads.

In this way, there is deposited on the mandrel the desired number of superimposed layers and it will be observed that if it is desired to have any part of the element reinforced, it is sufficient, in the first stage, to implant pins at the boundaries of this part, which will permit effecting one or more additional passes of thread within these pins by passing therearound in one direction and the other.

It should be stressed that, in the case of an evolutive surface having for example a concave part, there may be implanted, in the first stage, helical rows of pins against which the thread 33 is disposed.

When this second stage of the process according to the invention has terminated, a thread 50 is introduced in a third stage through the crossed layers and into the foam material of the mandrel.

For this purpose, a device of known type is employed which comprises a needle carrier and a thread-clamp and is adapted to effect a reciprocating to-and-fro movement in the longitudinal direction of the needle. This device is not part of the invention and will not be described in detail.

It has been found that the shape of the needle is of great importance for carrying out this third stage. Indeed, the threads employed are most often threads of fragile fibers which may tend to become separated.

Consequently, it has been observed that if a conventional needle is used with a throughway eye, the fibers of the thread disintegrate at the outlet of the eye on both sides of the latter causing cramming and breakage of the thread.

For this reason, a needle is used such as that shown in FIG. 3 or, as a modification, that shown in FIG. 4.

With reference to FIG. 3, the needle 43 comprises an oblique throughway eye 45 whose edge remote from the point 46 has an inner rounded portion 51 around which the thread is bent upon penetration of the needle, thereby avoiding damage to the thread or splitting liable to result in breakage.

Advantageously, the throughway eye 45 opens, at the end remote from the point 46, onto a longitudinal groove 44 which has a partly circular section and a depth which gradually decreases in the direction away from the point, through which groove the thread passes.

In the embodiment shown in FIG. 4, the needle 43a is hollow and defines an axial passage 44a which opens laterally and obliquely onto a non-throughway eye 45a whose edge remote from the point 46a has an inner rounded portion 51a similar to the rounded portion 51 of the needle 43, and the thread passes inside the needle.

A thread 50 is threaded through a thread-clamp 48 and the eye 45 of the needle 43 and introduced in the form of free loops by the needle 43 which is alternately thrust forward and withdrawn in accordance with the sequence represented in FIGS. 5a to 5f in the form of successive stitches to within the foam material.

The thread 50 is driven by the needle 43 through the layers, the thread-clamp 48 being tightened and the travel of the needle being so adjusted as to penetrate the foam of the mandrel to an extent a little beyond the eye 45 of the needle (FIGS. 5a, 5b, 5c).

The thread-clamp is then released (FIG. 5d) and the needle rises by gradually releasing the thread (FIG. 5e) through the layers and thus forming a small unclosed loop 53 which is retained solely by the action of the foam material and friction in the layers, just below the interface between the foam material and the first layer.

It will be understood that the elastic pressure exerted by the foam material in closing onto the loop after the withdrawal of the needle, on one hand, and the friction and gripping action of the threads in the superimposed layers, on the other hand, upon withdrawal of the needle, are sufficient to retain the thread 50 which freely travels along the groove 44 of the needle in the course of this withdrawal.

After having moved out of the layers of thread, the needle is raised above the surface of the layers a distance equal to the total thickness of the superimposed layers on the mandrel plus the stitching pitch, i.e. the desired spacing between two stitches (FIG. 5f).

The thread-clamp is then actuated for stopping the thread in the needle, the latter is advanced and the cycle is recommenced to form continuously a large number of loops 53 with the same thread 50.

The pins implanted in the mandril may be removed as the work progresses so as to avoid hindering this progression.

When the operation for introducing threads through the layers is terminated, the assembly is impregnated, either by leaving the reinforcement element on the mandrel or by previously removing the mandrel in the conventional manner.

In this respect, the essential feature of the element produced in accordance with the invention should be mentioned, namely the fact that the superimposed crossed layers of threads are maintained together, before the impregnation, solely by the conjugate gripping and friction actions of the threads of the superimposed layers on the continuous thread which passes therethrough and forms successive open loops interconnected on the outer surface of the element.

It has been found that these gripping and friction effects alone are sufficient to enable a reinforcement element constructed in accordance with the invention to be handled and to keep its shape after the extraction of the mandrel and before its impregnation. It will be understood that such a result can only be obtained with at least three crossed superimposed layers.

To remove the mandrel, the simplest method is to destroy the mandrel, for example by combustion.

FIG. 6 shows the shape of the finished element and reveals the arrangement of the threads in three dimensions.

The use of temporary pins according to the invention merely requires the implantation of a few hundreds thereof for laying the layers of a given element, while the use of picots of the prior art requires several tens of thousands of picots to be implanted as definitive threads of the same element.

Consequently, the larger space left free between the pins enables denser layers of threads to be laid, these threads being moreover placed still closer together by the introduction of the threads by means of the needle.

An element results whose features of resistance are much superior to those of elements of the prior art.

We claim:

1. A process for manufacturing composite reinforcement elements comprising the steps of: employing a disposable mandrel composed of foam, said mandrel having externally the internal shape of the reinforcement element to be produced; implanting rigid members in the mandrel wherein a portion of said rigid members extends from the surface of the mandrel; applying successive layers of fibers on the surface of the mandrel stretched out between rigid members, said fibers being superimposed and crossed in at least two directions; interconnecting said layers of fibers by means of fibers extending perpendicularly to said layers by driving a needle having an eye carrying the fibers through said layers and into the mandrel such that the eye of the needle fully penetrates the external surface of the mandrel; impregnating the fibers with a binder; hardening said binder after impregnation; withdrawing the pins and removing the mandrel wherein the rigid members are at all points around which a change in direction of the fibers is desired.

2. A process for manufacturing composite reinforcement elements woven in three dimensions from fibers, of complex shapes, having high resistance to thermo, mechanical or thermo-mechanical stresses, comprising the steps of: employing a disposable mandrel composed of a destructible material having externally the internal shape of the reinforcement element to be produced; implanting rigid members in the mandrel and applying on the surface of the mandrel successive layers of continuous fibers which are superimposed and crossed in at least two directions; interconnecting said layers by means of continuous fibers which extend perpendicularly to said successive layers by driving a needle having an eye carrying the fiber through said successive layers and into the mandrel such that the eye of the needle fully penetrates the material of the mandrel; impregnating fibers with a binder; hardening said binder after impregnation; destroying the mandrel; wherein said rigid members are pins temporarily implanted in the mandrel wherein a portion of said pins extends from the surface of the mandrel for retaining a continuous fiber stretched out between said pins and in contact with the surface of said mandrel, said layers being formed by stretching out a continuous fiber between said pins in such a manner as to form in succession at least three superimposed and crossed even layers, and said layers being interconnected by introducing through said layers from the exterior a continuous fiber forming successive open loops by means of a needle through which said fiber passes, and withdrawing said pins, said pins being implanted at points on the surface of the mandrel which are chosen as a function of its shape for retaining and maintaining the fiber stretched out on the surface of the mandrel between said pins so as to form an even layer, at all points around which a change in direction of the fiber is desired, said pins being implanted in circumferential and helical rows, said continuous fiber interconnecting the layers being introduced by the needle, the needle having a throughway eye having an edge defining an internal grounded portion and a longitudinal groove which opens laterally and obliquely onto the eye.

3. A process for manufacturing composite reinforcement elements woven in three dimensions from fibers, of complex shapes, having high resistance to thermo, mechanical or thermo-mechanical stresses, comprising the steps of: employing a disposable mandrel composed of a destructible material having externally the internal shape of the reinforcement element to be produced; implanting rigid members in the mandrel wherein a portion of said rigid members extends from the surface of the mandrel and applying on the surface of the mandrel successive layers of continuous fibers which are superimposed and crossed in at least two directions; interconnecting said layers by means of fibers which extend perpendicularly to said successive layers by driving a needle having an eye carrying the fiber through said successive layers and into the mandrel such that the eye of the needle and fibers carried by the needle fully penetrates the material of the mandrel; impregnating the fibers with a binder; hardening said binder after impregnation; destroying the mandrel; wherein said rigid members being pins temporarily implanted in the mandrel for retaining a continuous fiber stretched out between said pins and in contact with the surface of said mandrel, said layers being formed by stretching out a continuous fiber between said pins in such a manner as to form in succession at least three superimposed and crossed even layers, and withdrawing said pins; said pins being implanted at points on the surface of the mandrel which are chosen as a function of its shape for retaining and maintaining the fiber stretched out on the surface of the mandrel between said pins so as to form an even layer, at all points around which a change in direction of the thread is desired, said pins being implanted in circumferential and helical rows, said continuous fiber interconnecting the layers being introduced by the needle, the needle having a through-way eye having an edge defining an internal grounded portion and a longitudinal groove which opens laterally and obliquely onto the eye.

4. A process according to claim 1, comprising implanting said pins at points on the surface of the mandrel which are chosen as a function of its shape for retaining and maintaining the fiber stretched out on the surface of the mandrel between said pins so as to form an even layer.

5. A process according to claim 4, comprising implanting said pins in circumferential and helical rows.

6. A process according to claim 5, comprising introducing said continuous fiber through said layers by means of a needle having a throughway eye having an edge defining an internal rounded portion and a longitudinal groove which opens laterally and obliquely onto the eye.

7. A process according to claim 5, comprising introducing said continuous fiber through said layers by means of a hollow needle comprising a non-throughway eye having an edge defining an internal rounded portion and an axial passage which opens laterally and obliquely onto the eye.

8. A process according to claims 2 or 3, wherein the destructible material is selected from the group consisting of felt or rubber.

9. A process according to claims 7 or 9, wherein the destructible material is foam.

* * * * *